United States Patent
Kulshreshtha et al.

(10) Patent No.: US 10,059,785 B2
(45) Date of Patent: Aug. 28, 2018

(54) POLYPROPYLENE-POLYETHYLENE COMPOSITION WITH IMPROVED FLOWABILITY

(71) Applicant: BOREALIS AG, Vienna (AT)

(72) Inventors: Bhawna Kulshreshtha, Linz (AT); Markus Gahleitner, Neuhofen/Krems (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/764,677

(22) PCT Filed: Nov. 3, 2016

(86) PCT No.: PCT/EP2016/076474
§ 371 (c)(1),
(2) Date: Mar. 29, 2018

(87) PCT Pub. No.: WO2017/076933
PCT Pub. Date: May 11, 2017

(65) Prior Publication Data
US 2018/0215846 A1    Aug. 2, 2018

(30) Foreign Application Priority Data
Nov. 4, 2015 (EP) .................................... 15192861

(51) Int. Cl.
| | |
|---|---|
| *C08F 210/06* | (2006.01) |
| *C08F 210/16* | (2006.01) |
| *C08F 2/00* | (2006.01) |
| *C08L 23/12* | (2006.01) |
| *C08L 23/14* | (2006.01) |
| *C08L 23/08* | (2006.01) |
| *C08L 23/16* | (2006.01) |

(52) U.S. Cl.
CPC ............ *C08F 210/06* (2013.01); *C08F 2/001* (2013.01); *C08F 210/16* (2013.01); *C08L 23/0815* (2013.01); *C08L 23/12* (2013.01); *C08L 23/14* (2013.01); *C08L 23/16* (2013.01); *C08F 2500/12* (2013.01); *C08L 2207/02* (2013.01); *C08L 2207/20* (2013.01)

(58) Field of Classification Search
CPC ...... C08F 210/06; C08F 210/16; C08F 2/001; C08L 23/23; C08L 23/24; C08L 23/0815; C08L 23/16; C08L 2207/20; C08L 2500/12; C08L 2207/02

See application file for complete search history.

(56) References Cited

U.S. PATENT DOCUMENTS

2009/0048403 A1 * 2/2009 Costantini et al. .......................... B29B 17/0042
525/240
2017/0044359 A1 * 2/2017 Kahlen et al. .......... C08L 23/06

FOREIGN PATENT DOCUMENTS

| CN | 101341011 | 1/2009 |
|---|---|---|
| EP | 491566 | 6/1992 |
| EP | 591224 | 2/1996 |
| EP | 586390 | 6/1997 |
| EP | 1028984 | 7/2001 |
| EP | 1183307 | 7/2005 |
| EP | 2308923 | 4/2011 |
| WO | 2007071494 | 6/2007 |
| WO | 2013010879 | 1/2013 |
| WO | 2013075241 | 5/2013 |

OTHER PUBLICATIONS

International Search Report and Written Opinion for PCT/EP2016/076474 dated Jan. 20, 2017, 11 pages.
Extended European Search Report for EP15192861.1 dated Mar. 9, 2016, 5 pages.
TW Office Action with English translation for TW Application No. 105135709 dated Sep. 6, 2017, 7 pages.
Wei Zhu, et al, "Modification of PP/HDPE Blends by PP-PE Sequential Polymerization Product", Changchun Institute of Applied Chemistry, Chinese Academy of Sciences, Changchun, Jilin 130022, People's Republic of China, Journal of Applied Polymer Science, vol. 58, 515-521 (1995).

* cited by examiner

*Primary Examiner* — Nathan M Nutter
(74) *Attorney, Agent, or Firm* — Lowenstein Sandler LLP

(57) ABSTRACT

The invention is related to a composition of polypropylene and polyethylene, which contains specific compatibilizer and flow enhancer. Furthermore the present invention is also related to articles comprising the said composition and the use of said articles in packaging application.

14 Claims, No Drawings

POLYPROPYLENE-POLYETHYLENE COMPOSITION WITH IMPROVED FLOWABILITY

CROSS-REFERENCE TO RELATED APPLICATION(S)

This application is a national phase of International Application No. PCT/EP2016/076474, filed on Nov. 3, 2016, which claims the benefit of European Patent Application No. 15192861.1, filed on Nov. 4, 2015. The contents of these applications are hereby incorporated by reference in their entirety.

The present invention relates to a composition of polypropylene and polyethylene, which contains specific compatibilizer and flow enhancer. Furthermore the present invention is also related to articles comprising the said composition and the use of said articles in packaging application.

Polyolefins, like polypropylene and polyethylene are typical commodity polymers with many application areas and a remarkable growth rate. The reason is not only a favourable price/performance ratio, but also the versatility of these materials and a very broad range of possible modifications, which allows tailoring of end-use properties in a wide range. Chemical modifications, copolymerization, blending, drawing, thermal treatment and combination of these techniques can convert common-grade polyolefins to valuable products with special properties.

Recent years, the demand of using recycled polyolefins, originating from recovered waste plastic material derived from post-consumer waste (PCW) and/or post-industrial waste (PIW), in a compound with virgin polymer has increased within the last years, not the least because legal requirements exist in some segments like automotive applications.

One of the key problems in polyolefin recycling, especially when dealing with material streams from post-consumer waste (PCW) is the difficulty to quantitatively separate polypropylene (PP) and polyethylene (PE). Commercial recyclates from PCW sources have been found generally to contain mixtures of PP and PE, the minor component reaching up to <50 wt %.

Such recycled PP/PE-blends normally suffer from deteriorated mechanical and optical properties, have poor performance in odour and taste and they generally suffer from poor compatibility between the main polymer phases, resulting in both limited impact strength and heat deflection resistance. Such inferior performance is partly caused by PE with its lower stiffness and melting point forming the continuous phase even at PP concentrations up to 65% because of the normally higher viscosity of the PE components in PCW.

This normally excludes the application for high quality parts, and it only allows the use in low-cost and non-demanding applications.

Some research has been done to improve the compatibility between PP and PE. According to Wei hu et al.; Journal of Applied Polymer Science, Vol. 58, p. 515-521 (1995) the addition of ethylene-propylene copolymer as compatibilizer to blends of polypropylene and polyethylene can remedy the situation of high incompatibility to some extent and that ethylene-propylene rubber (EPR) or ethylene-propylene-diene rubber (EPDM) can substantially improve the toughness of the blends, but at the expense of deteriorated moduli and tensile strength.

WO2013075241 A1 also discloses a method of using ethylene-propylene-diene rubber (EPDM) or a random ethylene-propylene copolymer (EP-RACO) as compatibilizer for the recycling plastic blends.

However, so far most compatibilization efforts require the presence of a high molecular weight component, thus limiting the flowability of the final composition.

Therefore, it is an objective of the present invention to obtain PP/PE blends showing high stiffness as well as high impact strength and heat deflection temperature, while at the same time showing good flowability and processability. A further objective of the present invention is to improve both the mechanical properties and the processability of recycled PP/PE blends simultaneously, in order to make them suitable to be used in different applications. The finding of the present invention is that with special combination of a high flow polypropylene and a heterophasic polyolefin composition being compatibilizer, a high flow PP/PE composition is obtained with optimum balance of stiffness and impact, as well as increased heat deflection temperature.

Thus the present invention is directed to a polymer composition comprising
a) 10 to 50 wt % of a polymer blend (A) comprising 30 to 70 wt % of polypropylene (A1) and 70 to 30 wt % of polyethylene (A2),
b) 47 to 90 wt % of a polypropylene (B) having a melt flow rate MFR2 (230° C.) measured according to ISO 1133 of not lower than 50 g/10 min, and
c) 3 to 25 wt % of a Compatibilizer (C) being a heterophasic polyolefin composition comprising 55 to 90 wt % of a matrix (C1) being a polypropylene and 45 to 10 wt % of an elastomer (C2) being a copolymer of ethylene and propylene or C4 to C10 alpha olefin with a glass transition temperature Tg measured according to ISO 6721-7 of below −25° C. and an intrinsic viscosity measured according to DIN ISO 1628/1 at 135° C. of at least 3.0 dl/g,
wherein the polymer composition has a melt flow rate MFR2 (230° C.) measured according to ISO 1133 of higher than 25 g/10 min.

Further, the present invention in another aspect is directed to an article comprising the polymer composition as defined herein. Preferably the article is a film or a molded article, more preferably the article is a molded article, like bottles, caps, and automotive parts.

Yet a further aspect of the present invention is the use of the polymer composition as defined herein in the packaging applications, for example: in the production of flexible packaging, containers and household articles, like bottles and caps.

In the following the invention is defined in more detail.

The Polymer Composition

It is essential that the polymer composition according to this invention comprises a polymer blend (A), a polypropylene (B) and a Compatibilizer (C) being a heterophasic polyolefin composition, as three main components.

Accordingly, the polymer composition comprising
10 to 50 wt %, preferably 15 to 45 wt %, more preferably 20 to 40 wt % of a polymer blend (A), 47 to 90 wt %, preferably 50 to 85 wt %, more preferably 50 to 80 wt % of a polypropylene (B) and
3 to 25 wt %, preferably 4 to 20 wt %, more preferably 5 to 15 wt % of a Compatibilizer (C).

The polymer blend (A), polypropylene (B) and the Compatibilizer (C) are, thus, usually different.

It is also essential that the polymer composition according to this invention has a melt flow rate MFR2 (230° C.) measured according to ISO 1133 of higher than 25 g/10 min, preferably in the range of 26 to 80 g/10 min, more preferably in the range of 30 to 60 g/10 min.

It is surprisingly found that the polymer composition described in the present invention shows a significantly increased heat deflection temperature (HDT) and a simultaneously improved impact strength and tensile modulus, comparing to the polymer blend (A) without polypropylene (B) and Compatibilizer (C).

Accordingly in a preferred embodiment, the polymer composition according to the present invention has a heat deflection temperature (HDT) measured according to ISO 75B of at least 5° C., preferably at least 7° C., more preferably at least 10° C. higher than the HDT of the polymer blend (A). The difference will normally not exceed 30° C.

Additionally, in another preferred embodiment, the polymer composition has (i) a Charpy Notched Impact Strength measured according to ISO 179-1eA at 23° C. of at least 15%, preferably at least 20%, more preferably at least 25% higher than the polymer blend (A), and at the same time (ii) a Tensile Modulus measured according to ISO527-2 of at least 20%, preferably at least 25%, more preferably at least 30% higher than the polymer blend (A). The difference in both impact strength and modulus will normally not exceed 200%.

According to one specific embodiment, the polymer composition may further comprise inorganic or organic reinforcements like talc, glass fibers or wood fibers.

Thus, optionally the polymer composition according to the present invention may further comprise inorganic or organic reinforcement agents, usually fillers. The total amount of inorganic or organic reinforcement agents is preferably 1 to 20 wt %, more preferably 2 to 15 wt % based on the total amount of the polymer composition.

Suitable inorganic or organic fillers are talc, chalk, clay, mica, clay, or glass fibres, wood fibers and carbon fibres up to a length of 6 mm.

The mean particle size d50 of the filler may be chosen between 0.5 to 40 μm, preferably between 0.7 to 20 μm and more preferably between 1.0 to 15 μm.

The mean (or median) particle size is the particle diameter where 50% of the particles are larger and 50% are smaller. It is denoted as the d50 or D50.

In principle, this value may be determined by any particle measuring techniques, for example measuring techniques based on the principle of light diffraction.

Other techniques for determining particle sizes include, for example, granulometry in which a uniform suspension of a small quantity of the powder to be investigated is prepared in a suitable dispersion medium and is then exposed to sedimentation. The percentage distribution of the particle sizes can be estimated from the correlation between size and density of the spherical particles and their sedimentation rate as determined by Stokes law and the sedimentation time. Other methods for determining particle size include microscopy, electron microscopy, sieve analysis, sedimentation analysis, determination of the surface density and the like.

The particle size data appearing in the present specification were obtained in a well-known manner with a standard test procedure employing Stokes' Law of Sedimentation by sedimentation of the particulate material in a fully dispersed condition in an aqueous medium using a Sedigraph 5100 machine as supplied by Micromeritics Instruments Corporation, Norcross, Ga., USA (telephone: +1 770 662 3620; web-site: www.micromeritics.com), referred to herein as a "Micromeritics Sedigraph 5100 unit".

Preferably talc, glass fibres or wood fibres, more preferably talc is used as filler.

Before the talc is added it may be treated with various surface treatment agents, such as organic titanate coupling agents, silane coupling agents, fatty acids, metal salts of fatty acids, fatty acid esters, and the like, in a manner known in the state of the art. The talc may also be added without surface treatment. Preferably the talc is added without surface treatment.

In the following the individual components of the polymer composition are described in more detail.

The Polymer Blend (A)

Polymer blend A) in the polymer composition of the invention comprises 30 to 70 wt % of polypropylene (A1) and 70 to 30 wt % of polyethylene (A2).

In a preferred embodiment the Component A) is a recycled material, which is recovered from waste plastic material derived from post-consumer and/or post-industrial waste.

The polypropylene (A1) can comprise one or more polymer materials selected from the following:

I) isotactic or mainly isotactic propylene homopolymers;

II) isotactic random copolymers of propylene with ethylene and/or C4-C10 alpha-olefins, preferably ethylene and/or C4-C8 alpha-olefins, such as for example 1-butene, 1-hexene, 1-octene, 4-methyl-1-pentene, wherein the total comonomer content ranges from 0.05 to 20 wt %, or mixtures of said copolymers with isotactic or mainly isotactic propylene homopolymers;

III) heterophasic copolymers comprising an isotactic propylene homopolymer like (I) or random copolymers of propylene like (II), and an elastomeric fraction comprising copolymers of ethylene with propylene and/or a C4-C8 a-olefin, optionally containing minor amounts of a diene, such as butadiene, 1,4-hexadiene, 1,5-hexediene, ethylidene-1-norbornene.

For example, a polypropylene suitable for use as polypropylene (A1) may have a density of from 0.895 to 0.920 g/cm$^3$, preferably from 0.900 to 0.915 g/cm$^3$, and more preferably from 0.905 to 0.915 g/cm$^3$ as determined in accordance with ISO 1183 and a melt flow rate (MFR) of from 0.1 to 30 g/10 min, preferably from 0.5 to 25 g/10 min, and alternatively from 1.0 to 20 g/10 min as determined in accordance with ISO 1133 (at 230° C.; 2.16 kg load). Usually the melting temperature of polypropylene (A1) is within the range of 135 to 170° C., preferably in the range of 140 to 168° C., more preferably in the range from 142 to 166° C. In case it is a propylene homopolymer like item (I) above it will generally have a melting temperature of from 150 to 170° C., preferably from 155 to 168° C., and more preferably from 160 to 165° C. as determined by differential scanning calorimetry (DSC) according to ISO 11357-3. In case it is a random copolymer of propylene like item (H) above it will generally have a melting temperature of from 130 to 162° C., preferably from 135 to 160° C., and more preferably from 140 to 158° C. as determined by DSC according to ISO 11357-3.

Preferably, the polypropylene (A1) does not comprise a heterophasic copolymer like item (III) above.

The polyethylene (A2) is preferably a high density polyethylene (HDPE) or a linear low density polyethylene (LLDPE) or a long-chain branched low density polyethylene (LDPE).

The comonomer content of polyethylene (A2) is usually below 50 wt % preferably below 25 wt %, and most preferably below 15 wt %.

Herein an HDPE suitable for use as polyethylene (A2) in this disclosure has a density as determined according to ISO 1183 of equal to or greater than 0.941 g/cm$^3$, preferably from 0.941 to 0.965 g/cm$^3$, more preferably from 0.945 to 0.960 g/cm$^3$. In one embodiment, the HDPE is an ethylene homopolymer. An HDPE suitable for use as A-2) in this disclosure may generally have an MFR determined by ISO 1133 (at 190° C.; 2.16 kg load), of from 0.01 g/10 min to 50 g/10 min, preferably from 0.1 to 30 g/10 min, like from 0.5 to 20 g/10 min.

The HDPE may also be a copolymer, for example a copolymer of ethylene with one or more alpha-olefin monomers such as propylene, butene, hexene, etc.

An LLDPE suitable for use as polyethylene (A2) in this disclosure may generally have a density as determined with ISO 1183, of from 0.900 to 0.920 g/cm$^3$, or from 0.905 to 0.918 g/cm$^3$, or from 0.910 to 0.918 g/cm$^3$ and an MFR determined by ISO 1133 (at 190° C.; 2.16 kg load), of from 0.01 to 50 g/min, or from 0.1 to 30 g/10 min, like from 0.5 to 20 g/10 min. The LLDPE is a copolymer, for example a copolymer of ethylene with one or more alpha-olefin monomers such as propylene, butene, hexene, etc.

An LDPE suitable for use as A-2) in this disclosure may generally have a density as determined with ISO 1183, of from 0.915 to 0.935 g/cm$^3$, and an MFR determined by ISO 1133 (190° C.; 2.16 kg), of from 0.01 to 20 g/min. The LDPE is an ethylene homopolymer.

The melting temperature of component A-2) is preferably within the range of 100 to 135° C., more preferably in the range of 105 to 132° C.

In a preferred embodiment polymer blend (A) is a recycled material, which is recovered from waste plastic material derived from post-consumer and/or post-industrial waste.

Such post-consumer and/or post-industrial waste can be derived from inter alia waste electrical and electronic equipment (WEEE) or end-of-life vehicles (ELV) or from differentiated waste collection schemes like the German DSD system, the Austrian ARA system or the Italian "Raccolta Differenziata" system.

The blends can be either PP-rich or PE-rich materials or blends with approximately equivalent amounts of PP and PE.

The term "waste" is used to designate polymer materials deriving from at least one cycle of processing into manufactured articles, as opposed to virgin polymers. As mentioned above, all kinds of polyethylene, preferably HDPE, LLDPE or LDPE, or polypropylene can be present.

Such recyclates are commercially available, e.g. from Corpela (Italian Consortium for the collection, recovery, recycling of packaging plastic wastes), Resource Plastics Corp. (Brampton, ON), Kruschitz GmbH, Plastics and Recycling (AT), Vogt Plastik GmbH (DE) etc.

The amounts of polypropylene (A1) and polyethylene (A2) can be from 30 to 70 wt % of the polypropylene (A1) and from 70 to 30 wt % of the polyethylene (A2), preferably 40 to 60 wt % of the polypropylene (A1) and 60 to 40 wt % of the polyethylene (A2).

Polymer blend (A) in the present polymer composition preferably has an MFR (230° C., 2.16 kg, ISO 1133) of 0.2 to 50 g/10 min, preferably of 0.5 to 45 g/10 min, more preferably of 1.0 to 40 g/10 min.

The Polypropylene (B)

The polypropylene (B) in the present polymer composition is particular featured by a rather high melt flow rate. Accordingly the polypropylene (B) has a melt flow rate MFR2 (230° C.) measured according to ISO 1133 of not lower than 50 g/10 min, preferably in the range of 50 to 1000 g/10 min, more preferably in the range of 55 to 500 g/10 min, still more preferably in the range of 60 to 200 g/10 min.

In a preferred embodiment of this invention, the polypropylene (B) is a heterophasic polyolefin composition comprising
(a) a matrix (B1) being a propylene polymer
(b) an elastomer (B2) being a copolymer comprising units derived from
propylene and
ethylene and/or C4 to C20 a-olefin.

Generally in the present invention, the expression "heterophasic" indicates that the elastomer is (finely) dispersed in the matrix. In other words the elastomer forms inclusion in the matrix. Thus the matrix contains (finely) dispersed inclusions being not part of the matrix and said inclusions contain the elastomer. The term "inclusion" according to this invention shall preferably indicate that the matrix and the inclusion form different phases within the heterophasic polypropylene, said inclusions are for instance visible by high resolution microscopy, like electron microscopy or scanning force microscopy.

Heterophasic polyolefin compositions are generally featured by a xylene cold soluble (XCS) fraction and a xylene cold insoluble (XCI) fraction.

For the purpose of the present application the xylene cold soluble (XCS) fraction of the heterophasic polyolefin compositions is essentially identical with the elastomer of said heterophasic polyolefin compositions.

Accordingly when talking about the intrinsic viscosity and the ethylene content of elastomer of the heterophasic polyolefin compositions the intrinsic viscosity and the ethylene content of the xylene cold soluble (XCS) fraction of said heterophasic polyolefin compositions is meant.

Note that the matrix (B1) and elastomer (B2) in the polypropylene (B), as well as the matrix (C1) and elastomer (C2) in the Compatibilizer (C) described below, all apply to the description above.

Accordingly, the matrix (B1) content, i.e. the xylene cold insoluble (XCI) content, in the polypropylene (B) being a heterophasic polyolefin composition is preferably in the range of 75.0 to 93.0 wt %, more preferably in the range of 77.0 to 91.0 wt %, like 78.0 to 89.0 wt %.

On the other hand the elastomer (B2), i.e. the xylene cold soluble (XCS) content, in the polypropylene (B) being a heterophasic polyolefin composition is preferably in the range of 7.0 to 25.0 wt %, more preferably in the range of 9.0 to 23.0 wt %, like in the range of 11.0 to 22.0 wt %.

The first component of the Polypropylene (B) as a heterophasic polyolefin composition is the matrix (B1).

Polypropylenes suitable for use as matrix (B1) may include any type of isotactic or predominantly isotactic polypropylene homopolymer or random copolymer known in the art. Thus the polypropylene may be a propylene homopolymer or an isotactic random copolymer of propylene with ethylene and/or C4 to C8 alpha-olefins, such as for example 1-butene, 1-hexene or I-octene, wherein the total comonomer content ranges from 0.05 to 10 wt %.

Further and preferably the polypropylene matrix (B2) has a rather high melt flow rate. Accordingly, it is preferred that in the present invention the polypropylene matrix (B2), i.e. the xylene cold insoluble (XCI) fraction of the polypropylene (B), has an MFR2 (230° C.) measured according to ISO1133 of in a range of 100.0 to 1500.0 g/10 min, more preferably of 120.0 to 800.0 g/10 min, still more preferably of 140.0 to 600.0 g/10 min, like in the range of 150.0 to 500.0 g/10 min.

Furthermore, the polypropylene matrix (B1) can be multimodal or bimodal in view of the molecular weight.

The expression "multimodal" or "bimodal" used throughout the present invention refers to the modality of the polymer, i.e.

the form of its molecular weight distribution curve, which is the graph of the molecular weight fraction as a function of its molecular weight, and/or the form of its comonomer content distribution curve, which is the graph of the comonomer content as a function of the molecular weight of the polymer fractions.

The second component of the Polypropylene (B) as a heterophasic polyolefin composition is the elastomer (B2).

The elastomer (B2) comprises, preferably consists of, units derivable from (i) propylene and (ii) ethylene and/or at least another C4 to C20 α-olefin, like C4 to C10 α-olefin, more preferably units derivable from (i) propylene and (ii) ethylene and at least another α-olefin selected form the group consisting of 1-butene, 1-pentene, 1-hexene, 1-heptene and 1-octene. The elastomeric copolymer (E1) may additionally contain units derived from a conjugated diene, like butadiene, or a non-conjugated diene, however it is preferred that the elastomeric copolymer consists of units derivable from (i) propylene and (ii) ethylene and/or C4 to C20 α-olefins only. Suitable non-conjugated dienes, if used, include straight-chain and branched-chain acyclic dienes, such as 1,4-hexadiene, 1,5-hexadiene, 1,6-octadiene, 5-methyl-1, 4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane. Multi-ring alicyclic fused and bridged ring dienes are also suitable including tetrahydroindene, methyltetrahydroindene, dicyclopentadiene, bicyclo (2,2,1) hepta-2,5-diene, 2-methyl bicycloheptadiene, and alkenyl, alkylidene, cycloalkenyl and cycloalkylidene norbornenes, such as 5-methylene-2-norbornene, 5-isopropylidene norbornene, 5-(4-cyclopentenyl)-2-norbornene; and 5-cyclohexylidene-2-norbornene. Preferred non-conjugated dienes are 5-ethylidene-2-norbornene, 1,4-hexadiene and dicyclopentadiene.

Accordingly the elastomer (B2) comprises at least units derivable from propylene and ethylene and may comprise other units derivable from a further α-olefin as defined in the previous paragraph. However it is in particular preferred that elastomer (B2) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM) and/or an ethylene propylene rubber (EPR) as elastomer (B2) is especially preferred, the latter most preferred.

Like the matrix (B1) the elastomer (B2) can be unimodal or multimodal, like bimodal. Concerning the definition of unimodal and multimodal, like bimodal, it is referred to the definition above.

In the present invention the content of units derivable from propylene in the elastomer (B2) equates with the content of propylene detectable in the xylene cold soluble (XCS) fraction. Accordingly the propylene detectable in the xylene cold soluble (XCS) fraction ranges from 45.0 to 75.0 wt %, more preferably 40.0 to 70.0 wt %. Thus in a specific embodiment the elastomer (B2), i.e. the xylene cold soluble (XCS) fraction, comprises from 25.0 to 65.0 wt %, more preferably 30.0 to 60.0 wt %, units derivable from ethylene. Preferably the elastomer (B2) is an ethylene propylene non-conjugated diene monomer polymer (EPDM) or an ethylene propylene rubber (EPR), the latter especially preferred, with a propylene and/or ethylene content as defined in this paragraph.

A further preferred requirement of the present invention is that the intrinsic viscosity (IV) of the xylene cold soluble (XCS) fraction of the polypropylene (B) being a heterophasic polyolefin composition is rather low. Accordingly it is appreciated that the intrinsic viscosity of the xylene cold soluble (XCS) fraction of the polypropylene (B) being a heterophasic polyolefin composition is below 3.5 dl/g, more preferably not more than 3.4 dl/g. Even more preferred the intrinsic viscosity of the xylene cold soluble (XCS) fraction of the polypropylene (B) being a heterophasic polyolefin composition is in the range of 1.8 to 3.5 dl/g, more preferably in the range 1.9 to 3.4 dl/g, like 2.0 to 3.4 dl/g. The intrinsic viscosity is measured according to ISO 1628 in decalin at 135° C.

Preferably the propylene content of the polypropylene (B) is 85.0 to 96.0 wt %, more preferably 88.0 to 94.0 wt %, based on total weight of polypropylene (B), more preferably based the amount of the matrix (B1) and the elastomeric copolymer (B2) together, in case that the polypropylene(B) is a heterophasic polyolefin composition as defined above.

The Compatibilizer (C)

A compatibilizer is working as an interface in the composition of polypropylene and polyethylene to improve the compatibility of different component.

Accordingly, the Compatibilizer (C) of the polymer composition according to the invention is a heterophasic polyolefin composition comprising (i) 55 to 90 wt % of a matrix (C1) being a polypropylene and (ii) 45 to 10 wt % of a elastomer (C2) being a copolymer of ethylene and propylene or a C4 to C10 alpha olefin with a Tg measured with DMTA according to ISO 6721-7 of below 25° C. and an intrinsic viscosity (measured in decalin according to DIN ISO 1628/1 at 135° C.) of at least 3.0 dl/g.

Polypropylenes suitable for use as matrix (C1) may include any type of isotactic or predominantly isotactic polypropylene homopolymer or random copolymer known in the art. Thus the polypropylene may be a propylene homopolymer or an isotactic random copolymer of propylene with ethylene and/or C4 to C8 alpha-olefins, such as for example 1-butene, 1-hexene or 1-octene, wherein the total comonomer content ranges from 0.05 to 10.0 wt %.

A polypropylene suitable for use as matrix (C1) may have a density of from 0.895 to 0.920 g/cm$^3$, preferably from 0.900 to 0.915 g/cm$^3$, and more preferably from 0.905 to 0.915 g/cm$^3$ as determined in accordance with ISO 1183.

Usually matrix (C1) has a melting temperature of 130 to 170° C., preferably from 135 to 168° C. and most preferably from 140 to 165° C.

In case it is a propylene homopolymer it will have a melting temperature of from 150 to 170° C., preferably from 155 to 168° C., like from 160 to 165° C. as determined by differential scanning calorimetry (DSC) according to ISO 11357-3. In case it is a random copolymer of propylene with ethylene and/or C4 to C8 alpha-olefins it will have a melting temperature of from 130 to 162° C., preferably from 135 to 160° C., like from 140 to 158° C. as determined by DSC according to ISO 11357-3.

The melt flow rate of matrix (C1) ranges from 1.0 to 300.0 g/10 min, preferably from 2.0 to 200.0 g/10 min, and more preferably from 4.0 to 150.0 g/10 min, e.g. 4.5 to 150.0 g/10 min as determined in accordance with ISO 1133 (230° C.; 2.16 kg). In one embodiment the melt flow rate of matrix (C1) ranges from 4.0 to 75.0 g/10 min as determined in accordance with ISO 1133 (230° C.; 2.16 kg).

As elastomer (C2) a copolymer of ethylene and propylene or an C4 to C10 alpha olefin is used. The alpha olefin is preferably butene, hexene or octene, more preferably butene or octene and most preferably octene.

The copolymers of the elastomer (C2) have a glass transition temperature Tg (measured with DMTA according to ISO 6721-7) of below −25° C., preferably below −28° C., more preferably below −30° C., more preferably below −45° C. and an intrinsic viscosity (measured in decalin according to DIN ISO 1628/1 at 135° C.) of at least 3.0 dl/g, preferably at least 3.1 dl/g, more preferably of at least 3.2 dl/g and even more preferably of at least 3.3 dl/g.

The glass transition temperature Tg (measured with DMTA according to ISO 6721-7) of the elastomer (C2) is usually −65° C. or above, preferably −60° C. or above and most preferably −58° C. or above.

The intrinsic viscosity (measured in decalin according to DIN ISO 1628/1 at 135° C.) of the elastomer (C2) is usually 10.0 or less, preferably 9.0 or less and most preferably 8.5 or less. In case the elastomer (C2) is a copolymer of ethylene and propylene it has an ethylene content from 10 to 55 wt %, preferably from 15 to 50 wt %, and more preferably from 18 to 48 wt % and most preferably from 20 to 46 wt %.

In case the elastomer (C2) is a copolymer of ethylene and a C4 to C10 alpha olefin it has an ethylene content from 60 to 95 wt %, preferably from 65 to 90 wt % and more preferably from 70 to 85 wt %.

Note that the elastomer (C2) is different from the polyethylene (A2). Usually elastomer (C2) differs from polyethylene (A2) as regards their comonomer contents determined as weight percent. Preferably the comonomer content of polyethylene (A2) is lower compared with the comonomer content of the elastomer (C2), more preferably the comonomer content of polyethylene (A2) is at least 2 percentage points lower compared with the comonomer content of elastomer (C2) and most preferably the comonomer content of polyethylene (A2) is at least 5 percentage points lower compared with the comonomer content of elastomer (C2).

In the heterophasic polyolefin composition suitable as the Compatibilizer (C), the matrix (C1) is present in an amount of 55 to 90 wt %, preferably in an amount of 60 to 88 wt % and more preferably in an amount of 65 to 85 wt % and most preferably in an amount of 65 to 80 wt % and the elastomer (C2) is present in an amount of 10 to 45 wt %, preferably in an amount of 12 to 40 wt %, even more preferably in an amount of 15 to 35 wt % and most preferably in an amount of 20 to 35 wt %.

Compatibilizer (C) preferably has a content of ethylene homopolymers of not more than 10 wt %, more preferably not more than 5 wt % and most preferably Compatibilizer (C) is free of ethylene homopolymers.

The heterophasic polyolefin composition suitable as Compatibilizer (C) can be prepared by mechanical blending of matrix (C1) and elastomer (C2).

Polypropylene homopolymers or copolymers suitable as matrix (C1) for mechanical blending are commercially available, i.a. from Borealis AG or can be prepared by known processes, like in a one stage or two stage polymerization process comprising a loop reactor or a loop reactor with subsequent gas phase reactor, in the presence of highly stereospecific Ziegler-Natta catalysts or single-site catalysts like metallocene catalysts, known to the art skilled persons.

Copolymers suitable as elastomer (C2) for mechanical blending can be any copolymer of ethylene and propylene or ethylene and C4 to C10 alpha olefin having the above defined properties, which may be commercial available, i.a. from Borealis AG (AT) under the tradename Queo®, from DOW Chemical Corp (USA) under the tradename Engage®, or from ENI SpA (IT).

Alternatively these copolymers can be prepared by known processes, in a one stage or two stage polymerization process, comprising solution polymerization, slurry polymerization, gas phase polymerization or combinations therefrom, in the presence of highly stereospecific Ziegler-Natta catalysts, suitable vanadium oxide catalysts or single-site catalysts like metallocene or constrained geometry catalysts, known to the art skilled persons.

In another embodiment, the heterophasic polyolefin composition suitable as Compatibilizer (C) can be prepared by sequential polymerization, comprising at least two reactors wherein first the matrix (C1) is produced and secondly the elastomer (C2) is produced in the presence of the matrix (C1).

A preferred sequential polymerization process comprises at least one loop reactor and at least one subsequent gas phase reactor. Such a process can have up to 3 gas phase reactors.

The matrix (C1) being polyethylene is produced first, i.e. in the loop reactor, and subsequently transferred to the at least one gas phase reactor, where the polymerization of ethylene, propylene or a C4 to C10 alpha olefin or mixtures therefrom takes place in the presence of the matrix (C1). It is possible that the so produced polymer is transferred to a second gas phase reactor.

A further possibility is that the matrix (C1) is produced in the loop reactor and the first subsequent gas phase reactor. The matrix (C1) is then transferred to the at least second gas phase reactor where the polymerization of ethylene and propylene or a C4 to C10 alpha olefin or mixtures therefrom takes place in the presence of the matrix (C1). It is possible that the so produced polymer is transferred to a third gas phase reactor.

In a specific embodiment the heterophasic polyolefin composition suitable as Compatibilizer (C) is prepared by sequential polymerization comprising at least four reactors wherein first the polypropylene of matrix (C1) is produced in the loop reactor and the first subsequent gas phase reactor. The matrix (C1) is then transferred to the second gas phase reactor where the polymerization of ethylene and propylene or a C4 to C10 alpha olefin or mixtures therefrom takes place in the presence of the matrix (C1). The so produced polymer is then transferred to the third gas phase reactor where the polymerization of ethylene and propylene or a C4 to C10 alpha olefin or mixtures therefrom takes place in the presence of the product obtained in the second gas phase reactor.

The polymerization takes place in the presence of highly stereospecific Ziegler-Natta catalysts or single-site catalysts like metallocene catalysts, known to the art skilled persons. A suitable sequential polymerization process is, i.a. the Borstar® process of Borealis AG. Preferably the heterophasic polyolefin composition as Compatibilizer (C) is produced by sequential polymerization if the elastomer (C2) is an ethylene-propylene copolymer.

If the elastomer (C2) is an ethylene-C4 to C10 alpha olefin, the heterophasic polyolefin composition as Compatibilizer (C) is preferably produced by mechanical blending.

EXAMPLES

1. Measuring Methods

MFR was measured according to ISO 1133 at a load of 2.16 kg, at 230° C. for the pure PP components and all compositions.

Charpy Notched impact strength was determined according to ISO 179 1eA at 23° C. using 80×10×4 mm$^3$ test bars injection molded in line with EN ISO 1873-2.

Tensile Modulus was determined according to ISO 527-2 (cross head speed=50 mm/min; 23° C.) using injection molded specimens as described in EN ISO 1873-2 (dog bone shape, 4 mm thickness).

Heat Deflection Temperature (HDT) was determined according to ISO 75 B with a load of 0.45 MPa using 80×10×4 mm$^3$ test bars injection molded in line with EN ISO 1873-2.

Xylene cold solubles (XCS) content was determined at 25° C. according ISO 16152; first edition; 2005-07-01.

Intrinsic viscosity (IV) was measured according to DIN ISO 1628/1, October 1999 (in decalin at 135° C.).

Glass transition temperature Tg and storage modulus G' were determined by dynamic mechanical analysis (DMTA) according to ISO 6721-7. The measurements were done in torsion mode on compression moulded samples (40×10×1 mm3) between −100° C. and +150° C. with a heating rate of 2° C./min and a frequency of 1 Hz. While the Tg was determined from the curve of the loss angle (tan(δ)), the storage modulus (G') curve was used to determine the temperature for a G' of 40 MPa representing a measure for the heat deflection resistance.

Melting temperature (Tm) and crystallizaton temperature (Tc) were measured with Mettler TA820 differential scanning calorimetry (DSC) on 5 to 10 mg samples. DSC is run according to ISO 11357-3:1999 in a heat/cool/heat cycle with a scan rate of 10° C./min in the temperature range of +23 to +210° C. Crystallization temperature and heat of crystallization (Hc) are determined from the cooling step, while melting temperature and heat of fusion (Hf) are determined from the second heating step.

Comonomer content, especially ethylene content is measured with Fourier transform infrared spectroscopy (FTIR) calibrated with $^{13}$C-NMR. When measuring the ethylene content in polypropylene, a thin film of the sample (thickness about 250 μm) was prepared by hot-pressing. The area of absorption peaks 720 and 733 cm$^{-1}$ for propylene-ethylene-copolymers was measured with Parkin Elmer FFIR 1600 spectrometer.

Polyethylene content of the recyclate was determined using the DSC technique described above for determining the Melting temperature (Tm) and crystallization temperature (Tc).

For the recyclate the polyethylene content was calculated from the PE melting enthalpy in DSC (Hm(PE)) associated to the lower melting point for the composition (Tm(PE)) in the range of 110 to 130° C. For the determination of the present invention for fully crystalline PE a melting enthalpy of 298 J/g and an average degree of crystallinity of 50% was assumed.

2. Examples

Materials Used

Polymer Blend (A)

Dipolen S is a recycled polymer mixture comprising polyethylene and polypropylene obtained from mtm plastics GmbH, Niedergebra, Germany and has a polyethylene content of 40 wt % determined by DSC analysis. The melting points determined by DSC were 162° C. (PP) and 128° C. (PE).

Polypropylene (B)

PP1: Polypropylene (PP1) is a heterophasic polypropylene copolymer BJ998MO which is commercially available from Borealis AG.

PP2: Polypropylene (PP2) is a heterophasic polypropylene copolymer BJ400HP which is commercially available from Borealis AG.

PP3: Polypropylene (PP3) is a heterophasic polypropylene copolymer BJ368MO which is commercially available from Borealis AG.

Characterization of PP1 to PP3 is summarized in Table 1

TABLE 1 characterization of PP1 to PP3

|  |  | PP 1 | PP 2 | PP 3 |
|---|---|---|---|---|
| MFR | [g/10 min] | 100.0 | 100.0 | 70.0 |
| MFR of XCI | [g/10 min] | 350 | 160 | 160 |
| XCS | [wt %] | 22.0 | 13.0 | 20.0 |
| C2 total | [wt %] | 10.0 | 6.5 | 9.5 |
| C2 in XCS | [wt %] | 35 | 54 | 38 |
| IV of XCS | [dl/g] | 3.4 | 2.0 | 2.2 |

Compatibilizer (C)

Heterophasic Copolymer HECO-1:

HECO-1 was produced in a Borstar PP pilot plant with a prepolymerization reactor, one slurry loop reactor and one gas phase reactors.

The catalyst used for preparing HECO-1 has been produced as follows: First, 0.1 mol of MgCl$_2$×3 EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried. (Ti-content: 1.9 wt % and Mg-content: 22.0 wt %) Catalyst and its preparation concept is described in general e.g. in patent publications EP491566, EP591224 and EP586390.

The catalyst was used in combination with dicyclopentyldimethoxysilane [Si(OCH$_3$)$_2$(cyclo-pentyl)$_2$] as external donor (ED) and triethylaluminium (TEAL) as activator and scavenger in the ratios indicated in table 2. The catalyst was modified by polymerizing a vinyl compound in the presence of the catalyst system. The respective process is described in EP 1 028 984 and EP 1 183 307. The specific reaction parameters can be seen in Table 2.

TABLE 2

Preparation of heterophasic copolymer HECO-1

|  |  | HECO-1 |
|---|---|---|
| Prepolymerization | | |
| temperature | [° C.] | 30 |
| pressure | [kPa] | 5400 |
| TEAL/ED | [mol/mol] | 6 |
| residence time | [h] | 0.3 |
| Loop | | |
| H$_2$ amount | [mol %] | 3.89 |
| Temperature | [° C.] | 85 |
| Pressure | [barg] | 51.5 |
| MFR$_2$ | [g/10 min] | 88 |
| Split | [wt %] | 73 |
| 2. Gas phase | | |
| H$_2$ amount | [mol %] | 0.00009 |
| C$_2$/C$_3$ | [mol/kmol] | 378 |
| Temperature | [° C.] | 85 |
| Pressure | [barg] | 25 |
| Split | [wt %] | 27 |
| Product | | |
| MFR$_2$ | [g/10 min] | 10.9 |
| XCS | [wt %] | 24.5 |
| IV of XCS | [dl/g] | 6.3 |
| C2 of XCS | [wt %] | 20.8 |
| Tg of XCS | [° C.] | −32° |

The polymer compositions of polymer blend (A), polypropylene (B) and Compatibilizer (C) were prepared on a Coperion ZSK 25 co-rotating twin-screw extruder equipped with a mixing screw configuration with an LAD ratio of 25. A melt temperature of 200-220° C. was used during mixing, solidifying the melt strands in a water bath followed by strand pelletization.

For the reason of good comparison, CE5 is shown here being BH345MO commercially available from Borealis AG with a recognized good combination of very high stiffness, good flow properties and good impact strength. It has a MFR of 45 g/10 min and a density of 0.905 g/cm$^3$.

The amounts of the different components and the mechanical properties of the inventive examples and comparative examples can be seen in Table 3.

The invention claimed is:

1. A polymer composition comprising
   a) 10 to 50 wt % of a polymer blend (A) comprising 30 to 70 wt % of polypropylene (A1) and 70 to 30 wt % of polyethylene (A2),
   b) 47 to 90 wt % of a polypropylene (B) having a melt flow rate MFR2 (230° C.) measured according to ISO 1133 of not lower than 50 g/10 min, and
   c) 3 to 25 wt % of a Compatibilizer (C) being a heterophasic polyolefin composition comprising 55 to 90 wt % of a matrix (C1) being a polypropylene and 45 to 10 wt % of an elastomer (C2) being a copolymer of ethylene and propylene or C4 to C10 alpha olefin with a glass transition temperature Tg measured according to ISO 6721-7 of below −25° C. and an intrinsic viscosity measured according to DIN ISO 1628/1 at 135° C. of at least 3.0 dl/g,
   wherein the polymer composition has a melt flow rate MFR2 (230° C.) measured according to ISO 1133 of higher than 25 g/10 min.

2. The polymer composition according to claim 1, wherein the heat deflection temperature (HDT) measured according to ISO 75B of said polymer composition is at least 5° C. higher than the HDT of the polymer blend (A).

3. The polymer composition according to claim 1, wherein said polymer composition has
   (i) a Charpy Notched Impact Strength measured according to ISO 179-1eA at 23° C. of at least 15% higher than the polymer blend (A), and at the same time
   (ii) a Tensile Modulus measured according to ISO527-2 of at least 20% higher than the polymer blend (A).

4. The polymer composition according to claim 1, wherein the polymer blend (A) is a recycled material, which is recovered from waste plastic material derived from at least one of post-consumer or post-industrial waste.

5. The polymer composition according to claim 1, wherein the polypropylene (A1) has a melt flow rate MFR2 (230° C.) measured according to ISO 1133 of 0.1 to 30.0 g/10 min.

6. The polymer composition according to claim 1, wherein the polypropylene (B) is a heterophasic polyolefin composition having a xylene cold soluble (XCS) content measured according to ISO 6427 in the range of 7.0 to 25.0 wt %.

TABLE 3

Composition and mechanical properties of IE1 to IE5 and CE1 to CE5

| | (A) | | PP (B) | | (C) | | MFR | NIS | Δ NIS | Tens. Mod. | Δ Tens Mod. | HDT B | Δ HDT |
|---|---|---|---|---|---|---|---|---|---|---|---|---|---|
| Ex | [wt %] | type | [wt %] | type | [wt %] | type | [g/10 min] | [kJ/m$^2$] | [Δ %] | [MPa] | [Δ %] | [° C.] | Δ [° C.] |
| CE1 | 100 | Dipolen S | — | — | — | — | 7 | 5.00 | — | 820 | — | 71 | — |
| CE2 | 30 | Dipolen S | 70 | PP1 | — | — | 46 | 8.2 | 64 | 1220 | 49 | 88 | 17 |
| CE3 | 50 | Dipolen S | 50 | PP1 | — | — | 30 | 9.0 | 80 | 1124 | 37 | 80 | 9 |
| CE4 | 70 | Dipolen S | 30 | PP1 | — | — | 18 | 8.3 | 66 | 1078 | 32 | 75 | 4 |
| IE1 | 30 | Dipolen S | 65 | PP1 | 5 | HECO-1 | 44 | 10.1 | 102 | 1205 | 47 | 86 | 15 |
| IE2 | 30 | Dipolen S | 60 | PP1 | 10 | HECO-1 | 38 | 10.6 | 112 | 1186 | 45 | 86 | 15 |
| IE3 | 30 | Dipolen S | 55 | PP1 | 15 | HECO-1 | 32 | 11.5 | 130 | 1167 | 42 | 85 | 14 |
| IE4 | 30 | Dipolen S | 60 | PP2 | 10 | HECO-1 | 41 | 6.4 | 28 | 1319 | 60 | 85 | 14 |
| IE5 | 30 | Dipolen S | 60 | PP3 | 10 | HECO-1 | 34 | 9.5 | 90 | 1266 | 54 | 90 | 19 |
| CE5 | 100 | BH345MO | — | — | — | — | 45 | 5 | — | 1400 | — | 85 | — |

(A) Polymer blend (A)
(C) Compatibilizer (C)
MFR MFR 230° C./2.16 kg
NIS Charpy NIS 23° C.

7. The polymer composition according to claim 1, wherein the intrinsic viscosity (IV) measured according to ISO 1268-1 (decalin) of the xylene cold soluble (XCS) fraction of the polypropylene (B) being a heterophasic polyolefin composition is below 3.5 dl/g.

8. The polymer composition according to claim 1, wherein the melt flow rate MFR2 (230° C.) measured according to ISO 1133 of the xylene cold insoluble (XCI) fraction of the polypropylene (B) being a heterophasic polyolefin composition is in the range of 100.0 to 1500.0 g/10 min.

9. The polymer composition according to claim 1, wherein the polypropylene (B) has at least one of:
  (i) a total propylene content of 85.0 to 96.0 wt %, or
  (ii) a propylene content in the xylene cold soluble (XCS) fraction of 45.0 to 75.0 wt %.

10. The polymer composition according to claim 1, wherein the Compatibilizer (C) is selected from the group consisting of (i) an in-reactor blend obtained by a sequential polymerization process in at least two reactors, whereby first the matrix (C1) is produced and secondly a elastomer (C2) being a copolymer of ethylene and propylene is produced in the presence of the matrix (C1) and (ii) a mechanical blend of a matrix (C1) and a elastomer (C2) being a copolymer of ethylene and C4 to C10 alpha olefin.

11. The polymer composition according to claim 1, wherein the matrix (C1) is selected from the group consisting of isotactic polypropylene homopolymer, predominantly isotactic polypropylene homopolymer, random copolymers of propylene with ethylene, C4 to C8 alpha-olefins, and combinations thereof, wherein the total comonomer content ranges from 0.05 to 10.0 wt %, whereby the polypropylenes have a density of from 0.895 to 0.920 g/cm$^3$ measured according to ISO 1183.

12. The polymer composition according to claim 1, wherein the polymer composition may further comprise inorganic or organic reinforcements.

13. An article comprising a polymer composition according to claim 1.

14. A process comprising forming packaging articles from the polymer composition according to claim 1.

* * * * *